United States Patent [19]

Stern et al.

[11] Patent Number: 4,895,434

[45] Date of Patent: Jan. 23, 1990

[54] APPARATUS AND METHOD FOR 3-D MEASUREMENT USING HOLOGRAPHIC SCANNING

[75] Inventors: Howard K. Stern, Greenlawn; Joel Hecker, Port Jefferson Station; Peter Calabrese, Richmond Hill; Richard Schmidt, Huntington, all of N.Y.

[73] Assignee: Robotic Vision Systems, Inc., Hauppauge, N.Y.

[21] Appl. No.: 172,472

[22] Filed: Mar. 24, 1988

Related U.S. Application Data

[62] Division of Ser. No. 884,494, Jul. 31, 1986, Pat. No. 4,758,093.

[51] Int. Cl.$^4$ ............................................. G02B 26/00
[52] U.S. Cl. ..................................... 350/484; 350/320
[58] Field of Search ................ 350/484, 6.2, 174, 320, 350/162.2, 162.12, 169

[56] References Cited

U.S. PATENT DOCUMENTS 3,485,552  12/1969  Adler ..................................... 350/174
4,641,038  2/1987  Baker .................................... 350/6.2

Primary Examiner—Bruce Y. Arnold
Attorney, Agent, or Firm—Robin, Blecker, Daley & Driscoll

[57] ABSTRACT

A 3-D measurement system utilizing a holographic scanner is provided with beam direction compensation means for compensating for changes in angular deflection of the scanner and further means is provided for synchronizing the scanner diffraction segments with the camera imaging mechanism of the 3-D system as well as for providing multiple offsets of the projected beam.

4 Claims, 4 Drawing Sheets 4,895,434

APPARATUS AND METHOD FOR 3-D MEASUREMENT USING HOLOGRAPHIC SCANNING

This is a division of application Ser. No. 884,494, filed July 31, 1986, now U.S. Pat. No. 4,758,093.

BACKGROUND OF THE INVENTION

This invention relates to an apparatus and method for three dimensional (3-D) vision sensing or measurement and, in particular, to an apparatus and method for three dimensional vision sensing or measurement utilizing holographic scanning of the object or surface whose coordinates are to be measured or sensed.

U.S. patent application Ser. No. 697,796, filed and assigned to the same assignee hereof, discloses a 3-D measurement system in which the projector of the system utilizes a holographic scanning mechanism to transform the projected radiant energy beam of the projector into a collection of projected light planes. These light planes are directed onto the surface of the object to be measured and a camera mounted at an angle to the projected planes records the images of the intersections of the planes and the surface. These images can then be uniquely interpreted or processed to provide the 3-D coordinates of every resolvable point in the camera image of the surface via the triangulation relationship of the known baseline distance between the camera and projector, and the known angles of the optical axes of the projector and camera relative to the baseline.

Holographic scanning mechanisms of the type to be used in the measurement system of the '796 application are commercially available and generally are formed as rotatably mounted glass disks having sectors each provided with grating grooves etched into the surface of the disk. When a radiant energy beam, such as, for example, a laser beam is projected at an angle through the disk, the beam is deflected by the gratings of the disk. The amount of deflection is dependent upon the grating spacing, so that by incorporating several sectors having different grating spacings about the disk, the beam can be deflected at different angles as the beam impinges on each of the sectors of the disk. Moreover, as the beam encounters a particular sector and is deflected through the unique deflection angle corresponding to the sector, the rotation of the sector causes the beam to scan a straight line. The overall effect of rotating the disk on the projected beam is thus to create a collection of projected planes.

Advantageously, because of the optical properties of the grating sectors of the holographic disk, the deflection angle, which is a diffraction phenomenon, is maintained even if the disk wobbles. Off center rotation errors also do not affect performance, so that by using the holographic disk, a lower cost measurement system can be realized for a given precision requirement. Furthermore, the ability of the holographic disk to provide a deflection change on a segment to segment basis in any preselectable manner is advantageous over the continuous scanning of a beam brought about by scanning mechanisms formed from continuously rotated reflective surfaces or the like.

The utilization of a scanning beam as provided by the holographic disk to provide radiant energy along a plane, moreover, results in a more uniform intensity of the radiant energy as compared to spreading the energy over a plane with a lens. This provides a decided advantage when trying to maximize the dynamic range of the surface reflections over which a measurement and vision sensing system will operate.

In addition to disclosing the above discussed holographic measuring and vision sensing system, the '796 application also discloses that the number of projection planes realizable by such a system can be increased by cascading a plurality of scanning mechanisms, e.g., a plurality of holographic disks or by inserting a refracting material into the path of the radiant energy beam after passage through the scanning mechanism. In the latter case, the refractor provides a lateral offset to the beam as compared to the beam without the refractor and, therefore, effectively doubles the number of radiant energy planes realizable by the system.

U.S. Pat. No. 4,238,147, also assigned to same assignee hereof, discloses a 3-D measurement system in which the lens plane and film plane of the camera of the system and the plane of the radiant energy intersect in a common line. This type of configuration allows the camera focus to be set so that it is in proper focus for substantially all points 10 of the surface to be recorded, without having to readjust the setting of the focus for differently located points on the surface.

While the above prior art systems have been found usable, there is still a need to provide an overall 3-D measurement system employing holographic scanning which is less costly to manufacture and which does not suffer from temperature sensitivity usually attendant holographic scanners. Furthermore, it is important in such a system that synchronism be maintained between the system components including scanner and camera system and that there be provided means for increasing the projected planes in an inexpensive and simple way.

It is therefore a primary object of the present invention to provide a 3-D measuring system in which holographic scanning is utilized and in which the system components are coordinated and arranged to minimize manufacturing costs, to provide precision and repeatability in the deflection process, to allow for arbitrary deflection without a loss in performance and to provide simplicity in the overall system design.

It is a further object of the present invention to provide a 3-D measurement system of the aforesaid type in which a mechanism is included for synchronization of the system components.

It is yet a further object of the present invention to provide arrangements for increasing the projection plane capacity of such a 3-D measurement system, without adding significantly to the complexity of the system.

SUMMARY OF THE INVENTION

In accordance with the principles of the present invention, the above and other objectives are realized, in part, in a 3-D measurement system in which a holographic scanning mechanism is utilized in the system projector and in which the system projector is further provided with a beam direction compensator which compensates for changes in the deflection angle of the scanner, resulting from various factors including changes in wavelength of the radiant energy beam caused by environmental changes such as temperature variations. In addition to such beam direction compensator, the system is further provided with synchronizing means for synchronizing the operation of the scanner with the camera imagining mechanism of the system.

In the embodiment of the invention to be disclosed hereinafter, the projector components are mounted on a base plate and include a narrow band source of radiation and beam forming optics for forming a radiant energy beam therefrom. The beam is passed through the direction compensator which precedes the holographic scanner. The latter, in turn, is in the form of a rotating disk around whose circumference are segments of grating patterns. Focusing means and beam offsetting means follow the scanner and provide the resultant beam focused to the desired standoff distance on the object or surface to be measured. The beam is scanned by rotation of the holographic disk grating segments each of which also provide a particular deflection to the beam to thereby result in a collection of scanning planes.

The base plate provides a support for all the projector components. It also keeps the projected energy and the imaged field resulting from the system camera imagining system, which is likewise supported on the plate, in a fixed relationship between the time of calibration of the system and the time of actual use of the system for measurement purposes. The camera imaging system includes camera electronics, an imaging array and a lens which focuses reflected light from the object surface at the desired standoff distance onto the imaging array.

For synchronization of the camera imaging system and the holographic scanner, this embodiment further includes a synchronizing controller which synchronizes the output of the source of radiation which is in the form of a pulsed laser to the line rate of the camera electronics TV format signal. The synchronizer also synchronizes the holographic scanning disk so that it rotates to bring a first segment adjacent the radiant energy beam, then is held in this position until the vertical retrace time of the TV format signal and is then rotated at the rate which passes each disk segment through the radiant energy beam in each successive field time of the TV format signal.

In the disclosed embodiment, the projector of the system is also provided with a beam offsetting means in the form of a plate situated at a fixed angle relative to the projected radiant energy beam and whose position in and out of the beam path is solenoid controlled. With the offsetting means in the path of the beam, the beam is offset parallel to its original path. The offsetting means thus effectively doubles the number of projected beam paths and, hence, projected planes realizable with the system.

With the central optical axes of the projected radiant energy beam and the camera imaging system of the above-described 3-D system forming a horizontal plane, the radiant energy beam is vertically scanned, forming essentially a vertical plane of radiant energy within one exposure period of the imaging array of the camera system. Each grating pattern segment of the holographic disk deflects this vertical light plane through slightly different horizontal angles forming a collection of vertical radiant energy planes which may be doubled in number by rotating the disk twice; once with the offsetting means out of the path of the beam so that no offset occurs and once with the offsetting means in the path of the beam so that the beam is offset preferably by half the distance between the planes.

To measure the coordinates of the points on the surface of an object with the above embodiment of the invention, the aforementioned projected radiant energy planes sequentially confront thin surface stripes on the surface which are individually recorded by the camera system array and read out by the camera electronics. This camera signal is then converted by processing electronics into digital signals and the latter are fed to a computing means. The computing means converts the digital signals into measurement values indicative of the 3-D coordinates of each irradiated surface point on the object. Optical triangulation based upon the known projector to camera system separation or distance, the known projection angle and the measured camera system angles of each image, form the basis for computing the surface coordinates.

In further aspects of the present invention, the offsetting means of the 3-D system is formed by utilizing multiple glass diffraction plates, preferably formed to have a binary sequence of thickness. In an alternative construction, the offsetting means is in the form of a single plate of stepped thickness. In either case, the number of projected radiant energy planes is increased in a simple manner, enabling a larger number of object surface points to be measured.

BRIEF DESCRIPTION OF THE DRAWINGS

The above and other features and aspects of the present invention will become more apparent upon reading the following detailed description in conjunction with the following drawings, in which:

FIG. 1b shows a side view of the 3-D measuring system sensor of FIG. 1a;

DETAILED DESCRIPTION

Figure 1A:
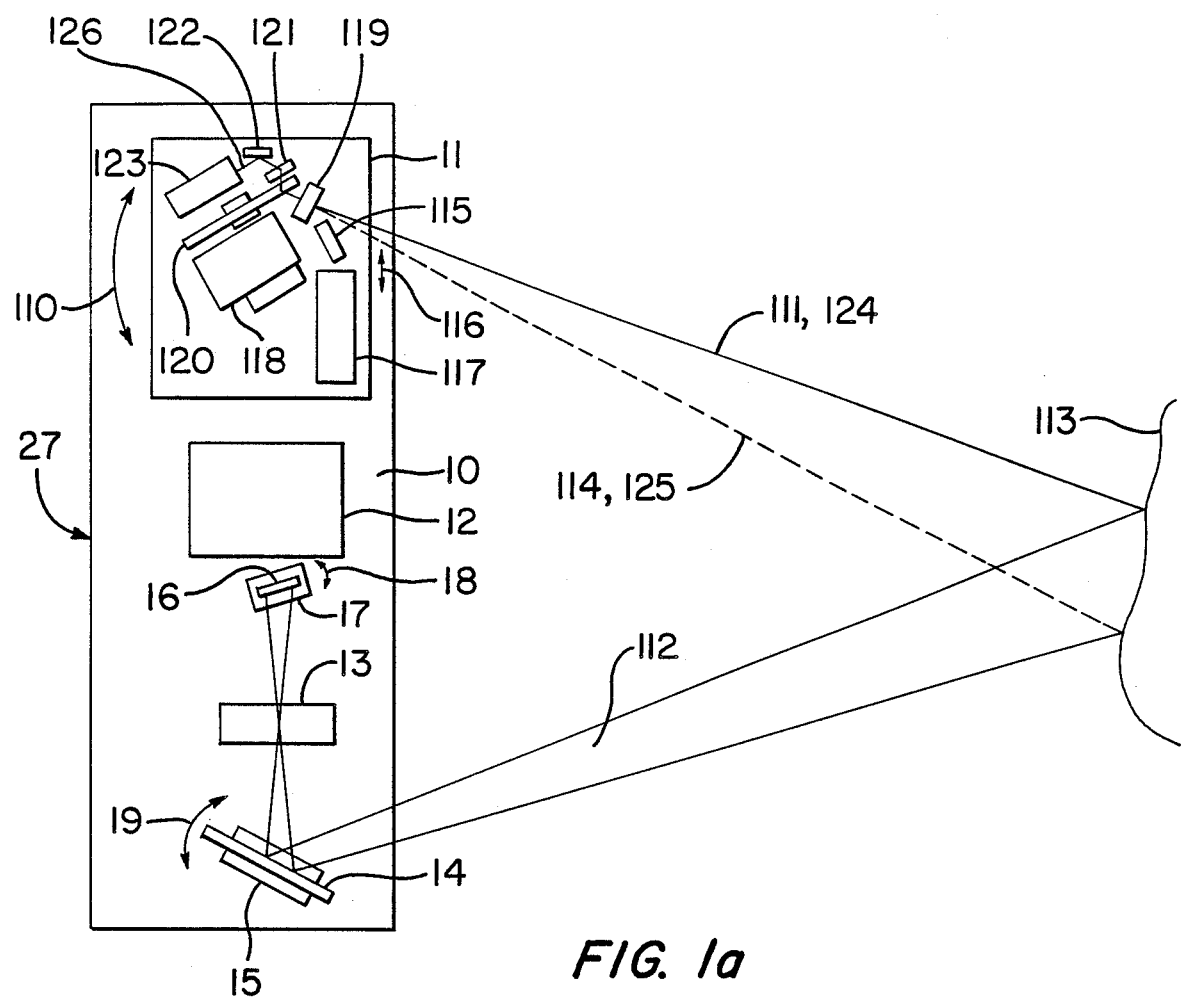
FIG. 1a shows a top view of a holographic 3-D measuring system sensor in accordance with the principles of the present invention.

FIG. 1a is a top view of a 3-D holographic measuring system sensor 127 in accordance with the principles of the present invention. The sensor 127 utilizes a scanned radiant energy beam, shown as light beam 126, to illuminate stripes on the surface of an object 113 whose surface points are to be measured. The illuminated stripes are imaged on an imagining array 16 of the sensor camera imagining system. Via triangulation of the projected path 111 and the imaging path 112 at measureable angles relative to the fixed baseline between these paths on the supporting baseplate 10, the 3-D coordinates of the object surface points can be determined.

Figure 1B:
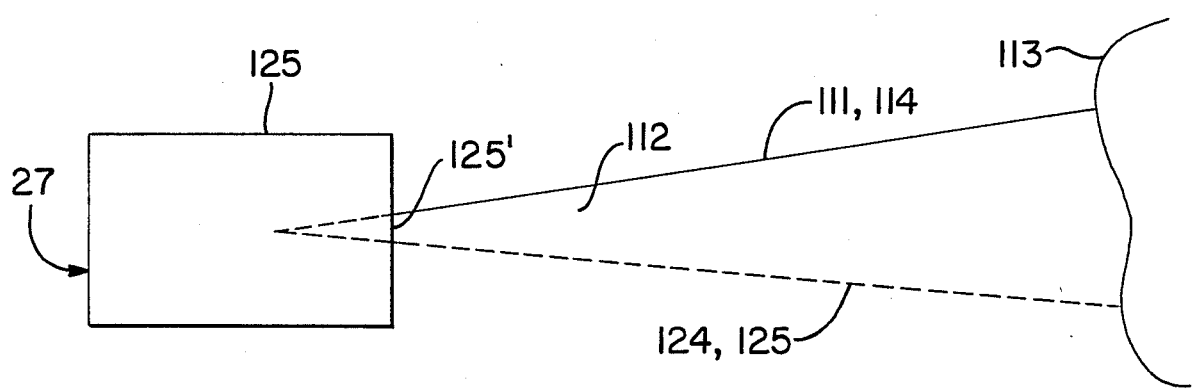

FIG. 1b shows a side view of the sensor 127 with its housing 125 in place. The housing 125 encloses all components of the sensor, these components being all mounted on baseplate 10. Openings 125, in the housing allow passage of light along paths 111, 112, 114, 124, and 125 and preferrably are sealed by material that blocks ambient light but readily passes radiation at the wavelength of the light beam source 123. Light along path 111 is scanned toward lower path 124 within a vertical plane in order to illuminate a vertical stripe on surface 113. This vertical scan and subsequent horizontal stepping of light path 111 toward path 114 and light path 124 toward path 125 is accomplished via a holographic scanning mechanism comprised of a rotating disk 120 driven by motor 118. Disk 120 contains holographic grating segments of the type described above and in the above-referenced '796 application.

Light beam source 123 forms light beam 126 via a solid state laser diode provided with beam forming optics. Light beam 126 is reflected by a rotatably mounted mirror 122. Mirror 122 may be rotated about a vertical axis to provide a horizontal angular adjustment during alignment of the direction of light beam path 111. Light beam-126., after reflection by mirror 122, is diffracted (bent) approximately 90 degrees by beam direction compensator 121, which is also adjustable about a vertical axis to assist in alignment. Light beam 126, after diffraction by compensator 121, is again diffracted approximately 90 degrees in the opposite direction by a grating segment of holographic disk 120. Thereafter, diffracted light beam 126 is focused by lens 119 along light path 111 to a minimum width at a specified distance from the sensor 127. This distance is defined as and referred to herein as the nominal standoff distance. A solenoid 117, when activated, inserts a glass plate 115 into the light beam paths 111-114 in the direction 116. When light beam 126 passes through glass plate 115, which is at an angle to the light beam path, the light beam is laterally offset as discussed above and in the '796 application. By adjusting the angle of the plate 115 offsets approximately equal to one-half the distances between the paths at the nominal standoff distance may be obtained.

Each grating segment on disk 120 scans light beam 126 vertically and diffracts the beam at slightly different angles between light beam paths 111 and 114. The angles are selected to equally space the paths. When the plate 115 is utilized the number of light beam paths is doubled.

All the elements 123, 122, 121, 120, 119, 118, 117, 115 mounted on plate 11 taken together collectively form the projector of the sensor 127. Plate 11 can be rotated about a vertical axis during the time of alignment to provide a variety of standoff distances and off center measurements. The directions of rotation are indicated by arrows 110 in FIG. 1a.

The remaining elements, (i.e., surface 15, mirror 14, lens 13, camera electronics 12, imaging array 16 and surface 17), form the camera imagining system of the sensor and are also directly mounted to baseplate 10. Light reflected from stripes of light on surface 113 illuminated by the projector is collected within light beam path 112, reflected off mirror 14, imaged by lens 13 upon imaging array 16. Camera electronics 12 reads out the image from array 16 and generates a standard TV format signal.

Mirror 14 is mounted on the surface 15 which is rotatable about a vertical axis. During alignment, the surface 15 is rotated to aim light beam path 112 to cross the projected light beam paths 111, 124, 114, 125 which form the four corners of the volume within which the projected light beam is confined. Path 112 is likewise a volume whose cross sectional area is imaged onto array 16. Surface 15 and, therefore, mirror 14, are rotated in directions 19 to aim light beam path 112 to center the common volume of path 112 and projected light beam paths 111, 124, 114, 125 at the nominal standoff distance. Lens 13 is focused for sharpest image at the nominal standoff distance and stopped down to provide adequate depth of field. Imaging array 16 is mounted on the surface 17 which is rotatable about a vertical axis as indicated by directions 18. Surface 17 and array 16 are rotated to obtain the sharpest average image of the projected light beam 126 along paths 111, 124, 114, 125 following the procedure of the '147 patent.

Figure 2:
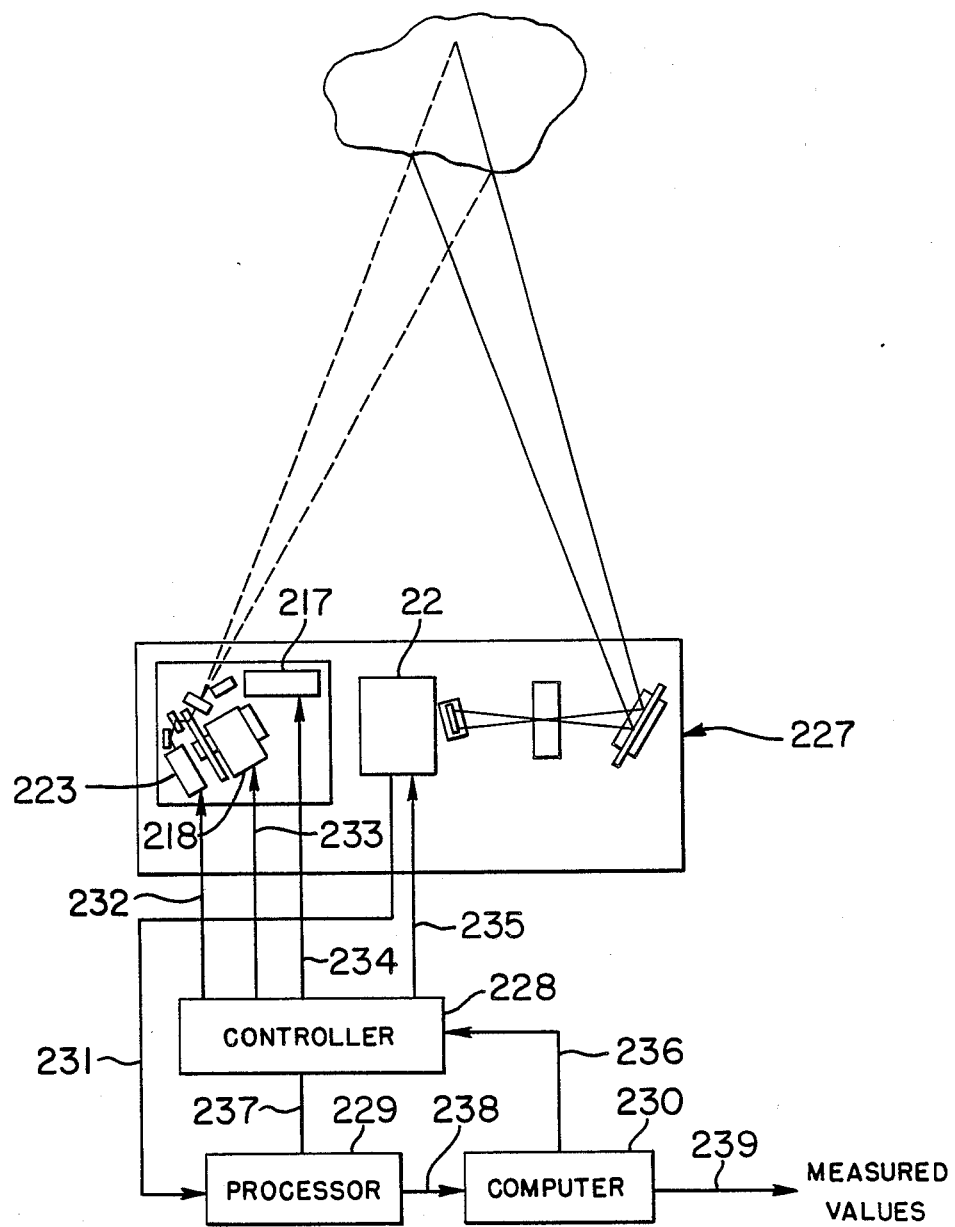
FIG. 2 illustrates a 3-D measuring system incorporating the measuring system sensor of FIGS. 1a and 1b.

FIG. 2 illustrates a vision sensor 227 (the components of the vision sensor 227 corresponding to those of the vision sensor 127 shown in FIG. 1 have the same last two digits, e.g., solenoid 217 in FIG. 2 corresponds to solenoid 117 in FIG. 1), incorporated into a complete 3-D measuring system. Computer 230 initiates a measurement via a request signal 236 to controller 228. Controller 228 provides all the timing and synchronization required for the system. Vertical and horizontal synchronizing signals 235 are provided by the controller to camera electronics 22, stepping pulses 233 are provided to motor 218, an activation signal 234 is provided to solenoid 217, a laser pulse triggering signal 232 is provided to light beam source 223 and timing pulses 237 are provided to processor 229. Processor 229 also receives a video or TV format signal 231 from camera electronics 22 and reports via signal 238 to computer 230 the TV line number and centroid (quantization count along the horizontal TV line) representing the light stripe image location on each TV line. Computer 230 converts the reported TV line numbers and centroids to 3-D coordinate data using calibration data stored in memory. The 3-D coordinate data are outputted via signal 239 from computer 230.

Figure 3:
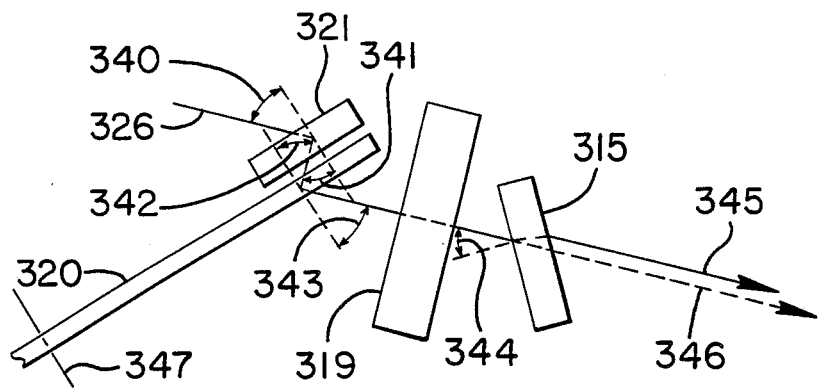
FIG. 3 illustrates the details of the beam direction compensation means for the holographic scanner and the beam offset means of the projector of the measuring system sensor of FIGS. 1a and 1b.

FIG. 3 illustrates the details of the projector of vision sensor 127 (again, in FIG. 3, like components as those in FIG. 1 have the same last two digits). Light beam 326 is incident on beam direction compensator 321 at angle 340 and exits at angle 341 after being diffracted by a diffraction grating on compensator 321. Angles 340 and 341 are related as follows:

sin (angle 340) + sin (angle 341) = $\lambda/d$ where $\lambda$ = light beam wavelength $d$ = spacing between adjacent grating lines typically $\lambda/d = \sqrt{2}$ Likewise, light beam 326 is incident on holographic disk 320 at angle 342 and exits at angle 343 after being diffracted by the diffraction grating of the disk. The angles 342 and 343 are related as follows:

sin (angle 342)+sin (angle 343)=$\lambda/d$ where $\lambda$ and d are as defined above Optimal performance of the sensor is obtained when angles 340, 341, 342, 343 are 45 degrees. Sensitivity to disk wobble is minimized since an increase in angle 342 is matched by a decrease in angle 343. Also, as environmental conditions such as temperature tend to affect the wavelength, $\lambda$, of the light beam source 123, angles 341 and 342 will change by equivalent amounts, thus effectively cancelling environmental sensitivity. This is assured by selecting the diffraction grating spacing d of the compensator 321 to be similar to that of the gratings on the disk segments.

As can be appreciated, therefore, the use of beam direction compensator 321 situated at the same angular orientation as holographic disk 320 and having a similar diffraction grating characteristic as the disk segments, provides compensation for changes in angular deflection of the disk 320 due both to mechanical wobble as well as environmental changes. The overall effect is thus a more reliable and accurate sensor.

After light beam 326 passes through disk 320 it is focused by lens 319 and the focused beam is projected along path 346. When glass plate 315 is interposed into path 346, however, beam 326 is incident on plate 315 at an angle 344 and is offset along path 345 parallel to path 346. The surfaces of plate 315 are parallel and the offset is given by:

$$\text{offset} = [T \sin(\theta_1 - \theta_2)] / \cos \theta_2$$

where
T = plate 315 thickness
$\theta_1$ = angle 344
$\theta_2$ = arc sin [n1 (sin $\theta_1$) /n2]
n1 = index of refraction of air = 1
n2 = index of refraction of glass = 1.5

As disk 320 is rotated about axis 347, each grating segment scans beam 326 in a plane perpendicular to the plane of the drawing along a path 346 (or 345) at different angles 343 as determined by grating spacing d of the segment.

Figure 4A:
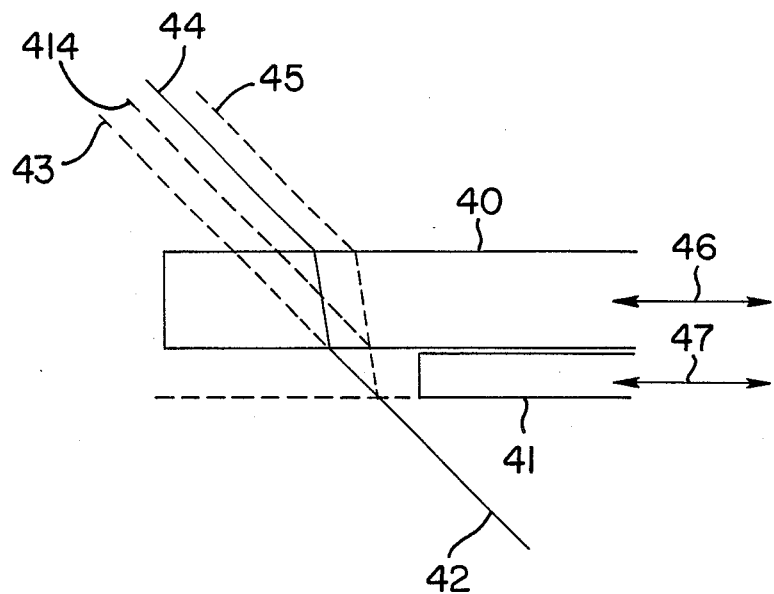
FIGS. 4a and 4b illustrate a first and second embodiments of beam offset means in accordance with the invention.

While the plate 315 allows for an offset beam path 345 in the projector, it would be desirable to be able to obtain an even larger number of offset paths while not over-complicating the projector structure. FIG. 4a illustrates a plate configuration which permits such a larger number of offset beam paths to be realized with a minimum of separate glass plates.

As shown in FIG. 4a, incident light beam 42 normally would follow path 43. Interposing glass plate 41 along direction 47 in path 42 would offset path 43 to 414. Interposing just glass plate 40 along direction 46 into path 42 would offset path 43 to 44 and interposing both glass plates 40 and 41 would offset path 43 to path 45. By choosing the thickness of plate 40 to be twice that of plate 41, three equally spaced offset paths can be generated with two glass plates. In general, by using N plates whose successive thicknesses increase 2:1, $2^N - 1$ offset paths can be generated.

Figure 4B:
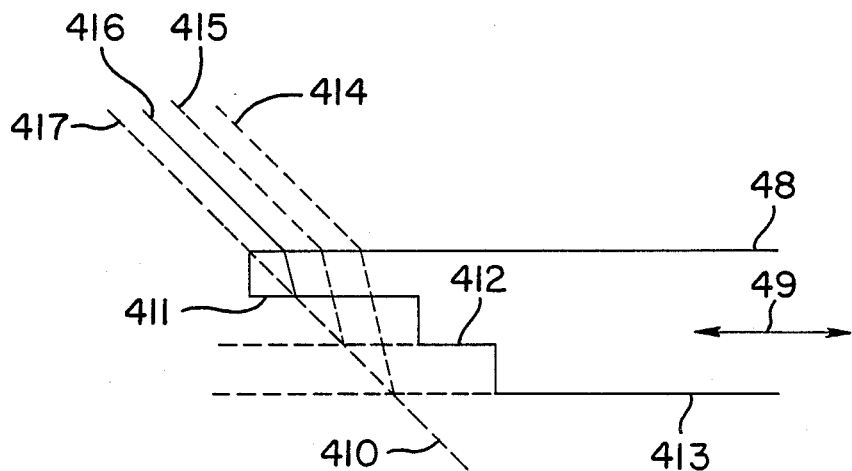

FIG. 4b shows an alternative configuration for realizing multiple offset paths. In this case, a single glass plate with stepped thicknesses is used. Incident beam 410 would normally follow path 417. Interposing first thickness step 411 of glass plate 48 along direction 49 offsets path 417 to path 416. Further motion of glass plate 48 interposes second step 412 which offsets path 417 to path 415. By interposing the final step 413 the path 417 is offset to path 414. Equal offset increments are obtained with equal increment thickness steps.

Figure 5:
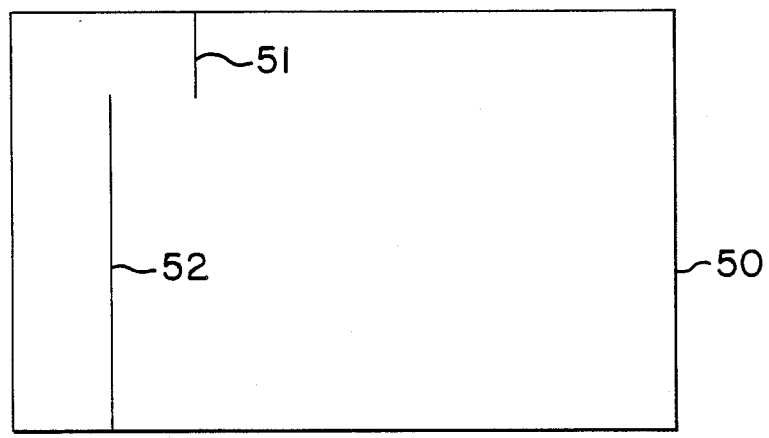
FIG. 5 shows a single TV field or line of imaged data improperly synchronized.

FIG. 5 illustrates the image that may be read out of the imaging array 16 of sensor 127 when the rotation of disk 120 is not properly synchronized with the array 16 readout. For proper synchronization the rotation rate must be selected to rotate each grating segment on disk 120 through beam 126 in the time of one TV field of the TV format signal generated by the camera electronics. Each grating segment on disk 120 subtends an equal angle so that continued synchronization is possible. To this end, the phase angle of the rotation of disk 120 is adjusted so that the light beam 126 transitions from one segment to the next during the vertical retrace time of the TV format signal. By transitioning prior to the end of the vertical retrace time by at least five times the time it takes to readout a single TV line it can be assured for reasonably well focused spot sizes that the scanning spot of illumination provided by light beam 126 on surface 113 will not degrade the output video TV format signal 231.

Looking now at FIG. 5 and assuming the scanning spot of beam 126 moves from top to bottom on the image and readout is from top to bottom, then if imaging array 16 transfers the image at the vertical retrace time of the TV format signal, readout field 50 will contain the broken image 51, 52 if the scanner disk 120 is not synchronized with the array readout. In such cases, light beam 126 is scanned by a portion of one segment of disc 120 forming image 52 and is then scanned by the next segment on disc 120 forming image 51. This is corrected by synchronizing segment transitions to occur during vertical retrace times of the TV format signal as previously described.

Synchronization may either be effected with disk 120 continuously rotating or by starting rotation on command. If continuous rotation is preferred then, referring to FIG. 2, when computer 230 requests a measurement, controller 228 must either wait for the segment on disk 120 that represents the start of the sequence of segments or processor 229 must be capable of starting with any segment in the sequence. Alternately, by using an accurately controllable motor 118, such as a stepping motor, disk 120 may be positioned such that the beam 126 is slightly before the starting segment and on request for measurement, the controller need only wait for the next vertical retrace time, accelerate disk 120 to speed, and processor 229 will receive the data in a fixed sequence. This also enables stopping disk 120 after one revolution, interposing glass plate 115 and repeating the process with offset light beams. When using continuous rotation of disk 120, either the disk must complete one full revolution during which time glass plate 115 is moved into place, or processor 229 must be capable of starting up within the sequence after glass plate 115 is in place.

In all cases, it is understood that the above identified arrangements are merely illustrative of the many possible specific embodiments which represent applications of the present invention. Numerous and varied other arrangements can readily be devised in accordance with the principles of the present invention without departing from the spirit and scope of the invention. Thus, for example, a third alternative to obtaining multiple offset paths for the beam 326 of FIG. 3 is to alter the angle 344 by rotating plate 315 about the vertical axis.

What is claimed is:

1. A method of offsetting the path of a radiant energy beam to multiple paths with a relatively few glass plates comprising: inserting a first glass plate at a predetermined angle into said radiant energy beam, to offset said beam to a first offset path; removing said first glass plate and inserting a second glass plate at said predetermined angle into said beam to offset said beam to a second offset path, said second glass plate being twice as thick as said first glass plate; and inserting said first glass plate with said second glass plate at said predetermined angle into said beam to offset said beam to a third offset path.

2. A method in accordance with claim 1 further comprising:
continuing said method for N glass plates, with each successive plate being twice as thick as the immediately preceding plate to offset said beam to $2^N - 1$ offset paths.

3. A method of offsetting the path of a radiant energy beam to multiple paths with a single glass plate having at least one step thickness change comprising: interposing by translating at a predetermined angle the thinnest step of said plate into said beam to offset said beam to a first offset path; translating said glass plate at said predetermined angle to bring the next thinnest step of said plate into said beam to offset said beam to a second offset path.

4. A method in accordance with claim 3 further comprising:
said plate having N steps;
and continuing said method to translate all N steps into said beam to offset said beam to N offset paths.

* * * * *